J. Davis.
Detaching Horses.
Nº 30,566.  Patented Nov. 6, 1860.
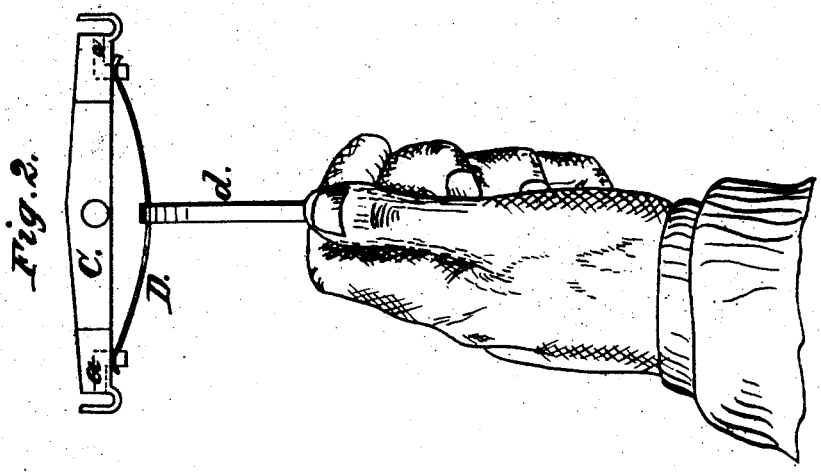
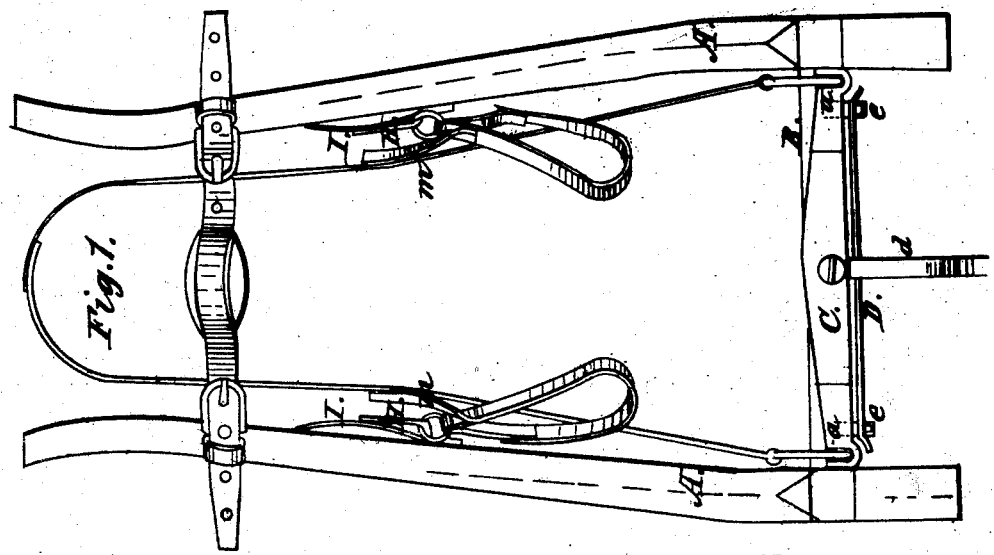
Witnesses.
Joseph Carter.
J. A. Howard
Inventor.
John Davis
pr his atty
C. DeWitt Smith

UNITED STATES PATENT OFFICE.

JOHN DAVIS, OF ELMIRA, NEW YORK.

APPARATUS FOR DETACHING HORSES FROM CARRIAGES.

Specification of Letters Patent No. 30,566, dated November 6, 1860.

*To all whom it may concern:*

Be it known that I, JOHN DAVIS, of Elmira, in the county of Chemung, in the State of New York, have invented a new and useful Improvement in Apparatus for Detaching Horses from Carriages; and I do hereby declare that the following is a full and exact description thereof, reference being had to the accompanying drawings, and to the letters of reference marked thereon, the same making a part of this specification.

In the said drawings the same letters of reference denote like parts in each figure.

The nature of my invention consists in providing an apparatus for easily and instantly detaching a horse from a vehicle. It is so arranged that the person in the vehicle, by touching a spring, can at once unloose the horse from all connection with said vehicle. It is a great convenience at all times, but especially so if a horse attempts to run away, where it obviates all danger, for the horse can be at once let loose to run his race while the wagon will stop still.

In the annexed drawings A, A, represent the thills of a vehicle, which are connected as usual near their rear ends by means of the cross-piece B.

C, represents the whiffle-tree which is attached to the cross piece B, by means of a bolt or pin in the ordinary manner.

a, a, represent metallic pins, which enter the whiffle-tree at its ends. These pins are provided with arms e, e, which extend through openings in the side of the whiffle-tree.

D, represents a spring which is almost as long, and which lies at the back, or rear quarter, of the whiffle-tree. The ends of this spring connect with the arms e, e.

d, represents a strap attached to the center of the spring D, which serves to bend the said spring at its center, and thus move it from the whiffle-tree at that point, causing the ends to approach nearer to each other. This movement of the spring, it will be seen, by drawing upon the arms e, e, causes the pins a, a, to enter the ends of the whiffle-tree. The traces being secured back by means of these pins, it will be readily seen, that when they are drawn in, said tugs will be freed, and the horse will be allowed to pass out from the vehicle, if not attached to it, at any other point. By loosening the strap d, the spring will return to its normal position, again throwing out the pins a, a, to receive the traces when desired.

The breeching straps are not bound around the thills in the usual manner, but are provided with rings which catch upon the hooks, H, H, which are attached to the thills as seen.

I, I, represent springs which are also attached to the thills, and so arranged that they will touch the hooks near their outer ends. The object of these springs is to keep the breeching ring upon the hooks, thus preventing its escape except when necessary.

It will be readily seen that when the traces are freed, and the horse starts to pass out of the thills, the breeching rings will bear down the springs I, I, and thus draw off, and free themselves from the hooks.

When the tugs, and the breeching straps are loosened the loops which attach to the saddle, and which sustain the forward portion of the thills, slide from the thills, and the horse is free to pass out.

m, m, represent straps which connect the tugs to the breeching straps near the ring, which catches into the hook H. Without a connection of this kind the thills are liable to be released from the saddle loops before the rings come out of the hooks; in that case the thills will fall and hang by the rings in the breeching-straps, and a sudden start of the horse would cause the thills to fly up against him and thus produce great damage.

By placing the thumb against either of the arms e, e, the pins may be moved back separately, for the purpose of attaching the traces one at a time, when it is desired to secure the horse to the vehicle.

I am aware that pins are used which move in and out of the whiffle-tree, in fastening the traces. Hence I disclaim them; but What I do claim is:

The arrangement of the whiffle-tree as constructed, with the thills provided with the hooks H, H, and springs I, I, substantially as, and for the purpose specified.

JOHN DAVIS.

Witnesses:
NELSON WELLS,
WM. BROWN.